United States Patent [19]

Atanasyan

[11] Patent Number: 5,647,204
[45] Date of Patent: Jul. 15, 1997

[54] METHOD FOR MONITORING THE EFFECTIVENESS OF A HEATED CATALYTIC CONVERTER FOR TREATING THE EXHAUST GASES OF AN INTERNAL COMBUSTION ENGINE

[75] Inventor: Alain Antranik Atanasyan, Tournefeuille, France

[73] Assignee: Siemens Automotive S.A., Toulouse, France

[21] Appl. No.: 525,671

[22] PCT Filed: Mar. 1, 1994

[86] PCT No.: PCT/EP94/00594

§ 371 Date: Sep. 12, 1995

§ 102(e) Date: Sep. 12, 1995

[87] PCT Pub. No.: WO94/20737

PCT Pub. Date: Sep. 15, 1994

[30] Foreign Application Priority Data

Mar. 12, 1993 [FR] France ................................ 93 02871

[51] Int. Cl.⁶ .................................................. F01N 3/20
[52] U.S. Cl. ............................ 60/274; 60/276; 60/277; 60/284; 60/289; 60/300
[58] Field of Search ............................ 60/274, 276, 277, 60/284, 289, 300

[56] References Cited

U.S. PATENT DOCUMENTS

| | | | |
|---|---|---|---|
| 5,077,970 | 1/1992 | Hamburg | 60/276 |
| 5,159,810 | 11/1992 | Grutter et al. | |
| 5,216,880 | 6/1993 | Aoki | 60/300 |

FOREIGN PATENT DOCUMENTS 0466311  1/1992  European Pat. Off. .

OTHER PUBLICATIONS

Patent Abstracts of Japan, vol. 17, No. 318 (M–1431) (5947) Jun. 17, 1993 & JP-A-5-33632 (Tokyo) Feb. 9, 1993.

*Primary Examiner*—Douglas Hart
*Attorney, Agent, or Firm*—Herbert L. Lerner; Laurence A. Greenberg

[57] ABSTRACT

The heated catalytic converter (1) is placed upstream of a three-way catalytic converter (2) in the outlet line (3) of the exhaust gases. The computer (7) comprises means for the closed-loop regulation of the air/fuel mixture supplied to the engine and means for implementing the method for monitoring the effectiveness of the three-way converter (2). According to the invention, when the engine is being started from cold, means for the closed-loop regulation of this mixture are activated when the temperature of the heated converter exceeds a predetermined temperature ($T_S$) and insufficient effectiveness of the heated catalytic converter is deduced from the appearance of any fluctuation in the output signal of the probe.

3 Claims, 1 Drawing Sheet

METHOD FOR MONITORING THE EFFECTIVENESS OF A HEATED CATALYTIC CONVERTER FOR TREATING THE EXHAUST GASES OF AN INTERNAL COMBUSTION ENGINE

BACKGROUND OF THE INVENTION

Field of the Invention

The present invention relates to a method for monitoring the effectiveness of a heated catalytic converter and, more particularly, of such a converter placed upstream of a three-way catalytic converter in an outlet line for the exhaust gases of an internal combustion engine.

A device for treating the exhaust gases of an internal combustion engine is known which comprises, as represented in FIG. 1 of the appended drawing, on the one hand, two catalytic converters 1 and 2 arranged in the exhaust line 3 of the engine and, on the other hand, means 4 for injecting air into this line, upstream of the catalytic converter 1. In this respect, reference may be made to the document No. 910840 entitled "New Potential Exhaust Gas After-treatment Technologies for Clean Car Legislation" by I. Gottberg and associates, published by the Society of Automotive Engineers in the United States of America.

As described in this document, the catalytic converter 1 is a converter which is heated, when the engine is being started from cold, by a source of electrical energy 5 such as a battery connected to the converter 1 through a power module 6 controlled by a computer 7. The heated converter 1 comprises a metal support covered by a coating of precious metal such as platinum, capable of catalyzing the oxidation of unburnt hydrocarbons and or carbon monoxide in order to convert them into less harmful chemical species. Passing an electrical current through this support thus covered causes Joule-effect heating of the converter capable of rapidly bringing the exhaust gases passing through it up to a temperature allowing these oxidation reactions. The injection 4 of air into these exhaust gases provides the additional oxygen necessary for these reactions. The oxidation reactions thus initiated are exothermal and contribute to heating up the catalytic converter 2 placed downstream of the heated catalytic converter 1, so that it can, after the period in which the engine is started from cold, take over most of the treatment of all harmful species contained in the exhaust gases of the engine, that is to say, apart from the unburnt hydrocarbons and carbon monoxide which have already been mentioned, the oxides of nitrogen which have to be reduced into less harmful species. The catalytic converter 2 is therefore called "three-way" owing to its triple action on the unburnt hydrocarbons, the carbon monoxide, and said oxides of nitrogen.

Of course, such means for treating the exhaust gases are effective only if the catalytic converters used are in good working order. Now, the coatings of precious metals used to oxidize some exhaust gases (platinum for example), for reducing others (rhodium for example) or for storing oxygen (cerium) degrade over time under the effect of "poisons" or other attacks such as those resulting from the combustion of unburnt hydrocarbons inside the converter. The active surface of the metal coating therefore decreases, which lowers the overall effectiveness of the converter.

Increasingly strict antipollution standards now envisage motor vehicles being equipped with on-board means for permanently monitoring the effectiveness of the catalytic converters used, so that a degradation of this effectiveness can be detected and remedied before this effectiveness falls below a minimum permissible level.

To this end, French Patent Application No. 91 13237 filed on 28 Oct. 1991 by the Applicant Company corresponding to copending U.S. application Ser. No. 08/232,228, describes a method for monitoring the effectiveness of a catalytic converter of the "three-way" type, like the catalytic converter 2 of the device of FIG. 1, this method being based on evaluating the converter's capability to store oxygen.

Such a method is applicable when the catalytic converter in question has reached its working temperature. However, in the case where at least one catalytic converter is heated, it is appropriate to monitor its effectiveness as early as possible, that is to say as was seen above, to monitor its capability to:

1) oxidize the unburnt hydrocarbons and the carbon monoxide, 2) rapidly bring the exhaust gases and the three-way catalytic converter placed downstreamup to a minimum working temperature of the order of 350° to 400° C., so as to reduce the production of harmful species to a minimum.

The object of the present invention is therefore to provide a method for monitoring the effectiveness of a heated catalytic converter placed in the outlet line of the exhaust gases of an internal combustion engine.

SUMMARY OF THE INVENTION

This object of the invention, together with others which will become clear from reading the description which will follow, are achieved with a method for monitoring the effectiveness of a heated catalytic converter placed in the exhaust gas outlet system from an internal combustion engine associated with a) means for closed-loop regulation of the composition of an air/fuel mixture supplied to the engine via at least one fuel injector, the open time of which is controlled by these means and b) means for monitoring the effectiveness of the catalytic converter, comprising an oxygen probe with an output signal which switches between two levels and which is placed downstream of the converter, these monitoring means controlling a forced temporal variation in the open time of the injector as a function of the change in the converter's oxygen-storage capability in order to deduce insufficient effectiveness of the converter from fluctuation in the output signal of the probe. According to the present invention, this method is noteworthy in that, when the engine is being started from cold with open-loop regulation of the richness of the air/fuel mixture, means for the closed-loop regulation of this mixture are activated when the temperature of the heated converter exceeds a predetermined temperature $T_S$ and insufficient effectiveness of the heated catalytic converter is deduced from the appearance of any fluctuation in the output signal of the probe.

Further features of the present invention will become clear from reading the description which will follow and from examining the appended drawing in which:

DESCRIPTION OF THE PREFERRED EMBODIMENT

Figure 1:
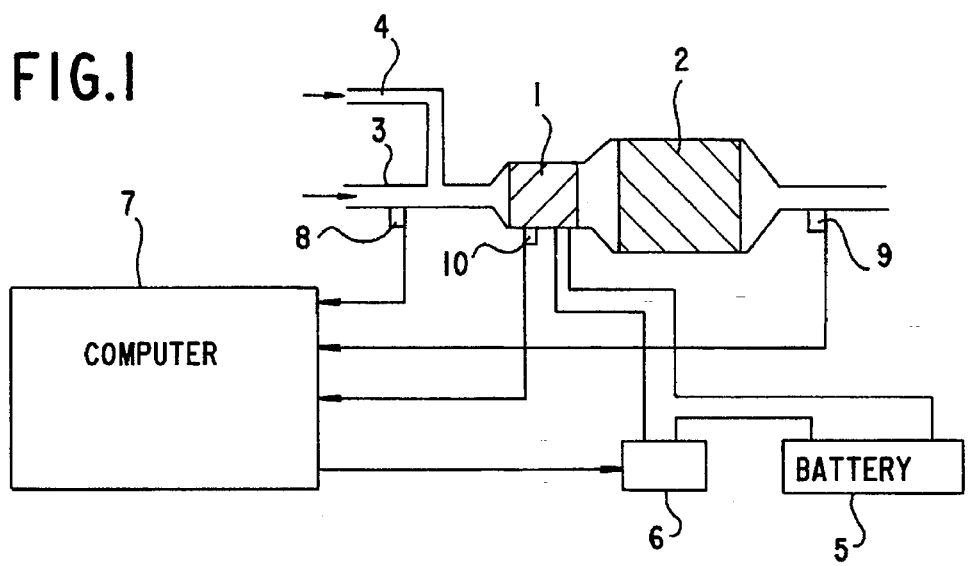
FIG. 1 is a diagram of a device for treating exhaust gases designed for the implementation of the method according to the present invention.
Figure 2A:
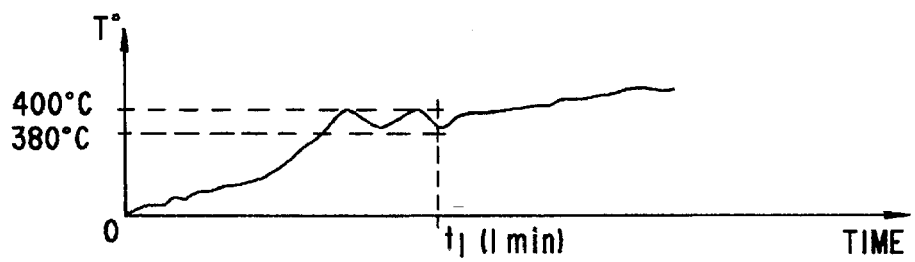
FIG. 2 is a set of time diagrams which are useful in explaining the working of the method according to the invention.
Figure 2B:
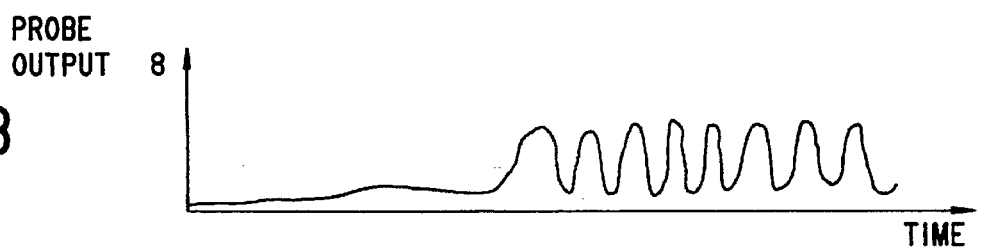
Figure 2C:
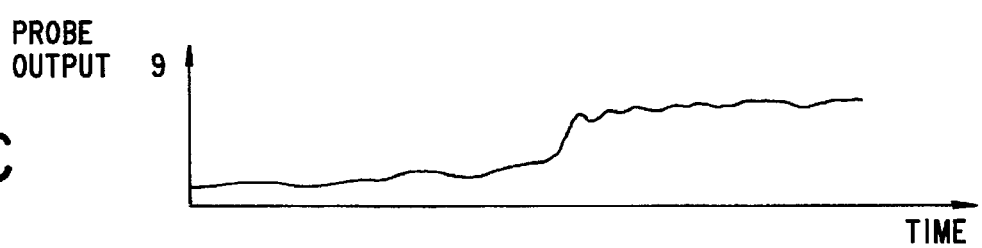
Figure 2D:
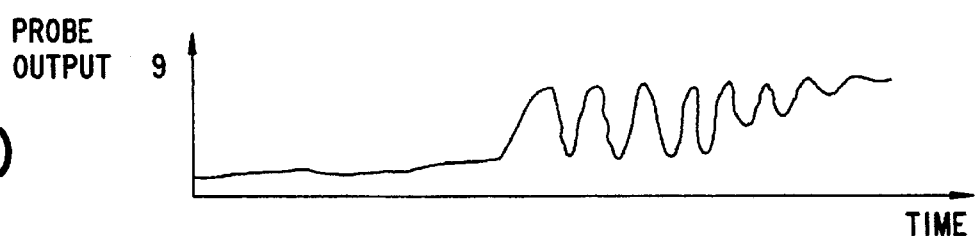

Reference is made to FIG. 1, already partly described in the preamble of the present patent application. Featured in this figure are first and second oxygen probes 8 and 9 respectively, placed upstream and downstream respectively of the catalytic converters 1 and 2. Means for the closed-loop regulation of the composition of the air/fuel mixture supplied to the engine (not represented) are incorporated in the conventional manner into the computer 7, the latter therefore taking account of various parameters such as the temperature of the cooling water, the temperature of the air, the pressure in the inlet manifold of the engine, the engine speed, etc. and the level of the output signal from the oxygen probe 8, called the "regulating probe".

According to the teachings contained in the aforementioned French patent application, incorporated into the present application by reference, the other probe 9 is a so-called "diagnostic probe" and serves to monitor the efffectiveness of the three-way catalytic converter 2. It is of the conventional type, with an output signal switching between two substantially fixed voltage levels when the oxygen richness of the exhaust gases of the engine passes through a predetermined level related to a stoichiometric composition of the air/fuel mixture supplied to the engine. This composition is detected indirectly by the probe 9, the output signal of which is fed into the computer 7 which is equipped with the means necessary to execute the monitoring method described in the aforementioned patent application. According to this method, an injector-open time capable of making the air/fuel mixture stoichiometric is measured, in regulation and in steady state, and then a periodic temporal variation of symmetric excursion, predetermined both in terms of amplitude and in terms of shape about a base opening time chosen from the measured open time, is imposed on the open time for a predetermined length of time and the base open time used during successive lengths of time is progressively and monotonically modified so as to culminate in the excursion of the open time being centered on the excursion in the oxygen-storage capability of the three-way catalytic converter, and an evaluation of the effectiveness of the catalyst is drawn from the appearance of any fluctuation in this signal.

More particularly, the excursion and the frequency of the temporal variation in the open time are fixed to values corresponding to a minimum acceptable capability of the catalytic converter to absorb oxygen and insufficient capability of the catalytic converter is diagnosed in the event of fluctuation arising in the output signal of the oxygen probe during the progressive modification in the base open time. Reference will be made to the aforementioned patent application for greater detail regarding the monitoring method described and the means of implementing it.

According to the present invention, use is also made of these means for monitoring the effectiveness of the heated catalytic converter 1. In this respect, use is made of the normal presence therein of a temperature sensor 10. When the engine is started from cold, the computer 7 actuates the power module 6 in order to make the battery 5 supply an electrical current for heating the converter 1. As rapid heating (typically lasting about a minute) of the converter 1 is necessary in order to limit pollution, the battery supplies a very strong current, of the order of several hundreds of amps, to the heated catalytic converter which therefores draws a power of 2 to 3 kW, for example. The temperature sensor 10 supplies its output signal to the computer 7 which regulates the electrical supply of the converter so as to prevent any risk of fire.

When the engine is started from cold, the composition of the air/fuel mixture is conventionally regulated in open loop by the computer 7, the fuel richness of the mixture then being greater than the stoichiometric amount in order to aid starting, this enriching of the mixture moreover generating substantial pollution for a length of time which has therefore to be reduced to a minimum, hence the benefit of the presence of the heated catalytic converter.

According to the present invention, during this phase in which the engine is being started from cold, when the temperature measured by the sensor 10 reaches a predetermined threshold temperature $T_S$, typically of the order of 350° to 400° C., the computer 7 stops controlling in open loop the composition of the air/fuel mixture and activates the means for regulating this mixture in closed loop.

Still according to the invention, when the device for treating the exhaust gases comprises an injection of air such as 4, the computer 7 cuts this off at the same time as activating the means for closed-loop regulation of the air/fuel mixture, so as not to disrupt the normal working of these means.

These are then the conditions of implementation of the method for monitoring the three-way converter described in the aformentioned French patent application. The computer therefore executes this method and, as described in this patent application, observes the output signal from the "diagnostic" probe 9.

If then the heated catalytic converter is working correctly, the exhaust gases are sufficiently heated, thanks both to the electrical heating of the converter and to the exothermal oxidation reactions which it catalyzes for the three-way converter to be capable of absorbing the variations in richness of the air/fuel mixture with respect to stoichiometry. The oxygen-storage capability of the three-way converter 9 (assumed to be effective) is therefore not exceeded, and the output signal from the probe 9 does not fluctuate.

This non-fluctuation can therefore be interpreted as signifying the correct working of the heated catalytic converter and, at the same time, of the combination of the two converters.

In the opposite case (fluctuation in the output signal from the probe 9), insufficient effectiveness is diagnosed with regard to the heated converter, which therefore does not allow the three-way converter to absorb the variations in richness, even when the latter is actually in good working order.

The method according to the invention is illustrated by the time diagrams of FIG. 2, where A represents the change in output signal of the temperature sensor 10, B represents the change in output signal of the probe 8, C represents the change in output signal of the probe 9 when the heated catalytic converter 1 is in good working order and D represents the change in output signal of this same probe when this converter is insufficiently effective.

In graph A, it is shown that the temperature of the heated catalyst increases up to a predetermined temperature, maintained by regulating between two thresholds fixed, by way of example, at 380° and 400° C. respectively, until a predetermined moment in time $t_1$. During the period of time $[0, t_1]$, the injection 4 of air is activated and the richness of the air/fuel mixture is adjusted in open loop by the computer 7. According to the invention, when this length of time, of the order of one minute for example, has elapsed, the injection 4 of air is cut off, the electrical heating of the converter 8, then deemed to sustain itself by means of the exothermal reactions which it catalyzes, is cut off, and the means for closed-loop regulation of the air/fuel mixture are activated. The output signal from the "regulating" probe 8 (see graph B) then begins to fluctuate normally within the context of this regulation, as is well known. As regards the "diagnostic" probe 9, if the heated catalyst 1 is sufficiently effective, both converters (the second being assumed to be effective) must be capable of absorbing the fluctuations in richness of the air/fuel mixture and the output signal from the probe (see graph C) remains stable, without fluctuating. In the opposite case (graph D) fluctuation appears on the output signal of the probe 9, these fluctuations then signifying a lack in effectiveness of the heated catalytic converter, still assuming that correct operation of the converter 2 has been verified independently using the method described in the aforementioned French patent application.

Thus, by virtue of the present invention, a particularly economical double use is made of the means for monitoring the effectiveness of the three-way catalyst, these means also being furthermore used in a specific way to monitor the effectiveness of the heated catalytic converter.

Of course the invention is not limited to the embodiment described and represented which has been given merely by way of example. Thus, the catalytic converter 1 could also catalyze reduction reactions and therefore be "three-way". In yet another alternative, the converters 1 and 2 could be replaced by a single, fully heated "three-way" converter. Such structures of converter depend on constructional choices, which have nothing to do with the present invention.

I claim:

1. A method for monitoring the effectiveness of a catalytic converter system with a heated converter and a non-heated three-way converter, wherein the catalytic converter system is disposed in an exhaust gas system of an internal combustion engine, and the catalytic converter system is associated with:

(a) regulating means for closed-loop regulation of an air/fuel mixture supplied to the engine via at least one fuel injector, where an open time of the fuel injector is controlled by the regulating means, the regulating means including an oxygen probe disposed upstream of the catalytic converter system, as seen in a flow direction of the exhaust gas, and (b) monitoring means for monitoring an effectiveness of the catalytic converter system, the monitoring means comprising an oxygen probe disposed downstream of the converter system, as seen in the flow direction of the exhaust gas, the oxygen probe issuing an output signal which switches between two levels, the monitoring means controlling a forced temporal variation in the open time of the fuel injector as a function of a change in an oxygen- storage capability of the catalytic converter system in order to deduce insufficient effectiveness of the converter from a fluctuation in the output signal of the oxygen probe, the method which comprises:

during engine start from cold with open-loop regulation of the air/fuel mixture, activating the regulating means for the closed-loop regulation of the air/fuel mixture when a temperature of the heated converter exceeds a predetermined temperature, and deducing insufficient effectiveness of the heated converter from a fluctuation in the output signal of the oxygen probe.

2. The method according to claim 1, wherein the heated converter is associated with air injection means for injecting air into the exhaust gas system upstream of the heated converter, as seen in the exhaust gas flow direction, and the method further comprises: cutting off the air injection means simultaneously with the activating step.

3. The method according to claim 1, wherein the method further comprises catalyzing only oxidation reactions of the exhaust gas with the heated converter.

* * * * *